US010848955B2

(12) United States Patent
Pazhyannur et al.

(10) Patent No.: US 10,848,955 B2
(45) Date of Patent: Nov. 24, 2020

(54) DISTRIBUTED MOBILITY MANAGEMENT FUNCTIONALITY

(71) Applicant: Cisco Technology, Inc., San Jose, CA (US)

(72) Inventors: Rajesh S. Pazhyannur, Fremont, CA (US); Irfan Ali, Palo Alto, CA (US); Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/377,642

(22) Filed: Apr. 8, 2019

(65) Prior Publication Data
US 2020/0322776 A1 Oct. 8, 2020

(51) Int. Cl.
| H04W 8/06 | (2009.01) |
| H04W 36/00 | (2009.01) |
| H04W 12/06 | (2009.01) |
| H04W 76/10 | (2018.01) |
| H04W 88/08 | (2009.01) |
| H04W 88/16 | (2009.01) |

(52) U.S. Cl.
CPC ............ *H04W 8/06* (2013.01); *H04W 12/06* (2013.01); *H04W 36/0011* (2013.01); *H04W 76/10* (2018.02); *H04W 88/08* (2013.01); *H04W 88/16* (2013.01)

(58) Field of Classification Search
CPC ... H04W 84/045; H04W 12/06; H04W 12/08; H04W 88/16; H04W 88/182
See application file for complete search history.

(56) References Cited

U.S. PATENT DOCUMENTS

| 8,804,682 B2 | 8/2014 | Hirano et al. |
| 8,948,014 B2 | 2/2015 | Velamati et al. |
| 9,225,399 B2 | 12/2015 | Shan et al. |
| 9,686,317 B2 | 6/2017 | Pancorbo Marcos et al. |
| 2011/0235505 A1 | 9/2011 | Eswara et al. |

(Continued)

FOREIGN PATENT DOCUMENTS

WO 2014201692 A1 12/2014

OTHER PUBLICATIONS

Rubén Solozabal, "Exploitation of Mobile Edge Computing in 5G Distributed Mission-Critical Push-to-Talk Service Deployment", Digital Object Identifier 10.1109/ACCESS.2018.2849200, Jul. 25, 2018, 11 pages.

(Continued)

*Primary Examiner* — Dung Hong
(74) *Attorney, Agent, or Firm* — Edell, Shapiro & Finnan, LLC

(57) ABSTRACT

Techniques are described for providing wireless network connectivity using a distributed mobility management functionality. In one example, each of a plurality of on-premise access points co-locate a mobility management functionality and a packet routing and forwarding functionality. Each of the plurality of on-premise access points obtain, from user equipment, a request to wirelessly connect to the on-premise access point. Each of the plurality of on-premise access points provide the user equipment with wireless network connectivity using the co-located mobility management functionality and the packet routing and forwarding functionality.

20 Claims, 13 Drawing Sheets

(56) References Cited

U.S. PATENT DOCUMENTS

| | | | | |
|---|---|---|---|---|
| 2012/0003980 | A1* | 1/2012 | Lim | H04W 76/12 455/445 |
| 2012/0099578 | A1* | 4/2012 | Aramoto | H04W 8/20 370/338 |
| 2015/0282026 | A1* | 10/2015 | Gupta | H04W 76/14 370/331 |
| 2016/0014826 | A1* | 1/2016 | Mizikovsky | H04L 63/123 370/329 |
| 2016/0192256 | A1* | 6/2016 | Jha | H04W 8/02 455/438 |
| 2017/0055153 | A1* | 2/2017 | Fransen | H04W 12/06 |
| 2017/0332265 | A1* | 11/2017 | Lui | H04W 24/08 |
| 2018/0132111 | A1 | 5/2018 | Mueck et al. | |
| 2019/0159014 | A1* | 5/2019 | Gamishev | H04W 8/082 |
| 2019/0313235 | A1* | 10/2019 | Miklos | H04W 8/065 |

OTHER PUBLICATIONS

3GPP Organizational Partners, "3rd Generation Partnership Project; Technical Specification Group Services and System Aspects; Architecture enhancements for non-3GPP accesses (Release 15)", 3GPP TS 23.402 V15.3.0, Mar. 2018, 314 pages.

Alcatel-Lucent, "EUTRAN Cell and Interface Management", Document No. LTE/SYS/DD/026072, Feb. 10, 2011, 99 pages.

Saurabh Gupta et al., "Load Balance MME in Pool", Document ID: 119021, Jun. 19, 2015, 9 pages.

Shreyasee Mukherjee et al., "A Distributed Core Network Architecture for 5G Systems and Beyond", NEAT'18: ACM SIGCOMM 2018 Workshop on Networking for Emerging Applications and Technologies, Aug. 20, 2018, 6 pages.

P. Gurusanthosh et al., "SDMA: A Semi-Distributed Mobility Anchoring in LTE Networks", 2013 International Conference on Selected Topics in Mobile and Wireless Networking (MoWNeT), https://ieeexplore.ieee.org/document/6613809, Aug. 19-21, 2013, 7 pages.

"LTE Indoor CPE", FCC ID: SRQ-WF821, Apr. 23, 2017, 62 pages; https://fccid.io/SRQ-WF821/User-Manual/User-manual-3367430.iframe.

Richard Lucas, "Understanding PortLand", Richard Lucas' Blog, Apr. 28, 2016, 5 pages.

Ericsson, "Mobile Broadband Router for Mobile Networks", Ericsson L13, created Jan. 3, 2012, 122 pages.

"Triple Play Service Delivery Architecture Guide", DHCP Management, Issue: 01, 60 pages, last modified May 19, 2017.

* cited by examiner

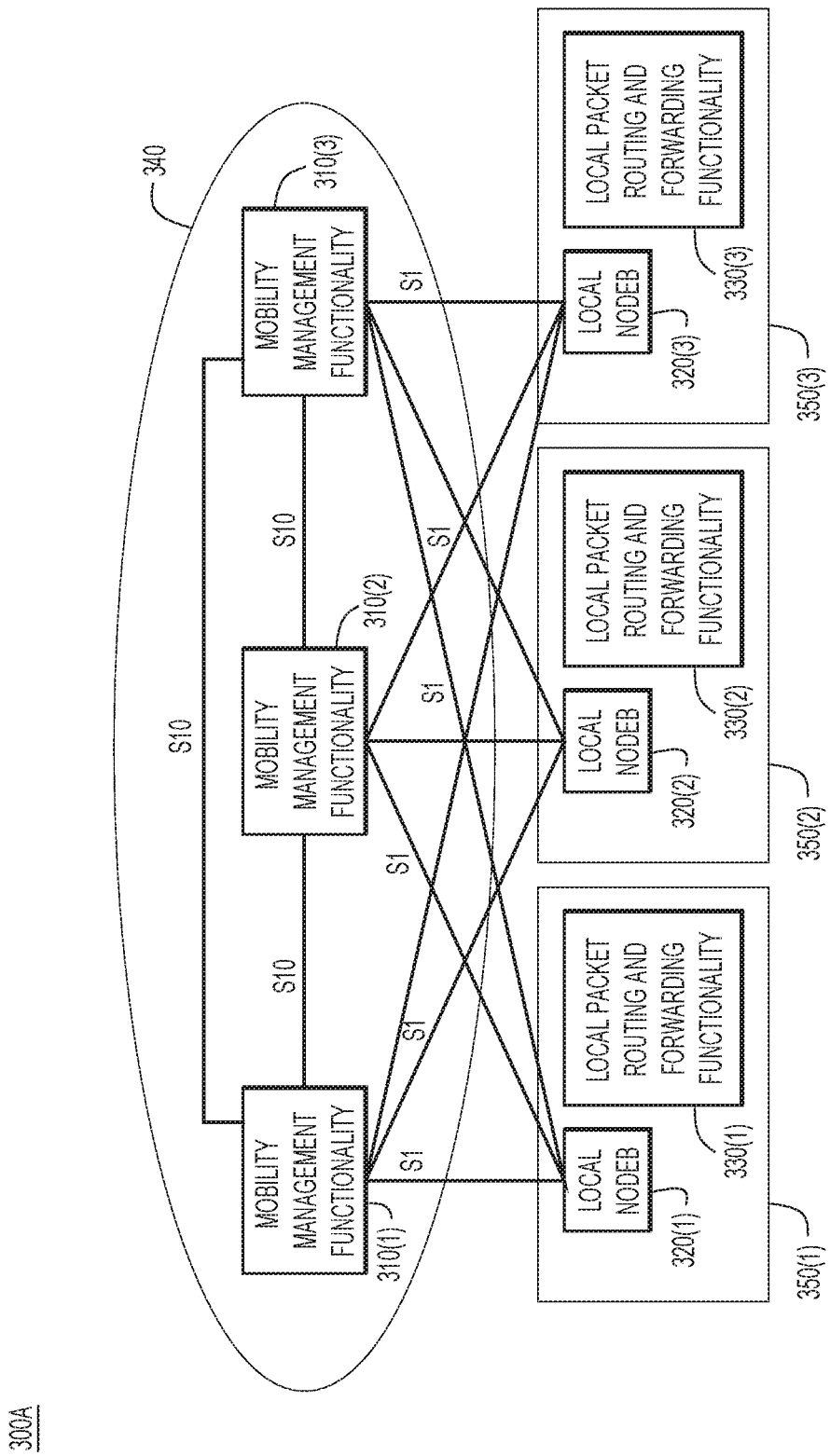

DISTRIBUTED MOBILITY MANAGEMENT FUNCTIONALITY

TECHNICAL FIELD

The present disclosure relates to mobile communications.

BACKGROUND

There are different generations of cellular mobile communication systems (e.g., fourth generation (4G), fifth generation (5G), etc.) which may be implemented in mobile environments. Depending on the particular mobile environment (e.g., small retail store versus large campus), the number of deployed Access Points can range from the single digits (e.g., 2-4) to the tens or even hundreds. Mobile environments typically include a packet core (e.g., an Evolved Packet Core (EPC)) that provides a set of management services for the mobile environment. In private mobile environments, the packet core is managed by the enterprise (rather than a service provider). The enterprise can manage the packet core on-premise or in the cloud.

BRIEF DESCRIPTION OF THE DRAWINGS

FIGS. 3A and 3B illustrate assignment of respective mobility management functionalities to respective access points, according to an example embodiment.

DESCRIPTION OF EXAMPLE EMBODIMENTS

Overview

Techniques are described for providing wireless network connectivity using a distributed mobility management functionality. In one example, each of a plurality of on-premise access points co-locate a mobility management functionality and a packet routing and forwarding functionality. Each of the plurality of on-premise access points obtain, from user equipment, a request to wirelessly connect to the on-premise access point. Each of the plurality of on-premise access points provide the user equipment with wireless network connectivity using the co-located mobility management functionality and the packet routing and forwarding functionality.

Example Embodiments

Figure 1:
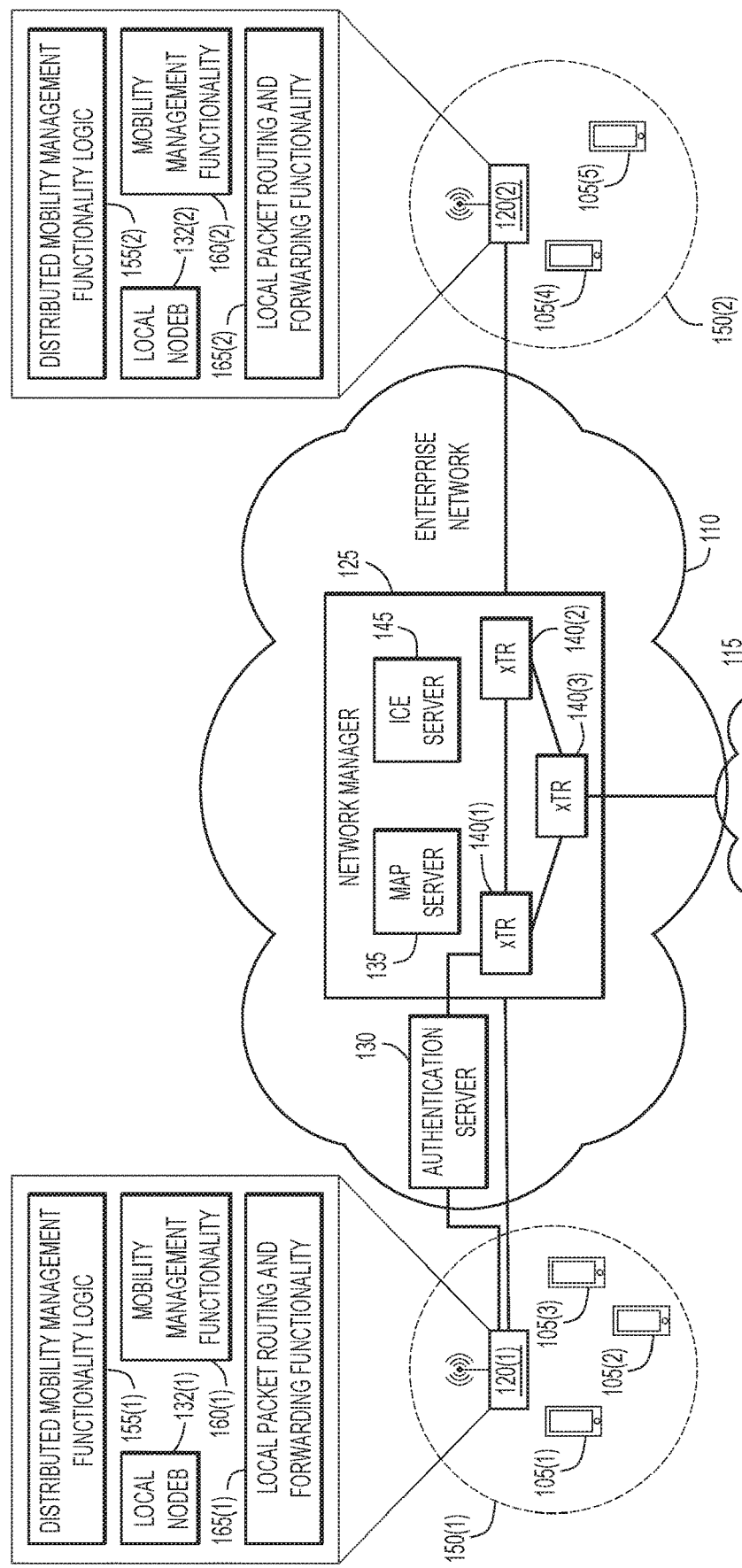
FIG. 1 illustrates a system that includes a distributed mobility management functionality, according to an example embodiment.

FIG. 1 illustrates a system 100 that includes a distributed mobility management functionality according to an example embodiment. System 100 includes user equipment (UE) 105(1)-105(5) (e.g., client devices), enterprise network 110, and Internet 115. Enterprise network 110 includes wireless access points (APs) 120(1) and 120(2), network manager 125, and authentication server 130. APs 120(1) and 120(2) respectively include local base station (e.g., "NodeB") functionalities 132(1) and 132(2). In one example, network manager 125 may include a map server 135, ingress/egress Tunnel Routers (xTRs) 140(1)-140(3), and Interactive Connectivity Establishment (ICE) server 145.

In one example, enterprise network 110 may be a 4G network. In this case, APs 120(1) and 120(2) may comprise 4G APs (e.g., APs configured for 4G systems), local NodeB functionalities 132(1) and 132(2) may comprise evolved NodeB (eNB) functionalities, and authentication server 130 may be a Home Subscriber Server (HSS). In another example, enterprise network 110 is a 5G network. In this example, APs 120(1) and 120(2) may comprise 5G APs (e.g., APs configured for 5G systems), local NodeB functionalities 132(1) and 132(2) may include next Generation NodeB (gNB) functionalities, and authentication server 130 may comprise at least a portion of Authentication Server Function (AUSF) and/or Unified Data Management (UDM).

APs 120(1) and 120(2) may be configured to provide wireless Wide Area Network (WAN) connectivity. Coverage areas 150(1) and 150(2) respectively represent the range of coverage provided by APs 120(1) and 120(2). UEs 105(1)-105(3) are located within coverage area 150(1), and UEs 105(4) and 105(5) are located within coverage area 150(2). Accordingly, AP 120(1) provides access to Internet 115 for UEs 105(1)-105(3) and AP 120(2) provides access to Internet 115 for UEs 105(4) and 105(5) (e.g., through xTRs 140(1)-140(3)).

In this example, enterprise network 110 has a packet core that is managed on-premise by the enterprise. Conventionally, the packet core of enterprise network 110 would be centralized (e.g., existing as a single physical or virtual entity). However, centralized packet cores can be cumbersome (e.g., cause poor network latency), particularly for smaller deployments (e.g., 2-5 APs) and would inhibit integration into the broader enterprise network 110. Enterprise network 110 is a smaller deployment because only two APs (APs 120(1) and 120(2)) are present. As such, a centralized packet core could be overly burdensome for enterprise network 110 from a deployment and management standpoint. Accordingly, distributed mobility management functionality logic 155(1) and 155(2) are provided in APs 120(1) and 120(2), respectively, to reduce the burden associated with conventional centralized packet cores.

In particular, distributed mobility management functionality logic 155(1) and 155(2) enable APs 120(1) and 120(2) to perform operations consistent with a distributed packet core (or at least a distributed portion of a packet core). In the example of FIG. 1, AP 120(1) includes mobility management functionality 160(1) and AP 120(2) includes mobility management functionality 160(2). In addition, AP 120(1) includes local packet routing and forwarding functionality 165(1) and AP 120(2) includes local packet routing and forwarding functionality 165(2). Thus, mobility management functionality 160(1) is co-located with local NodeB functionality 132(1) and local packet routing and forwarding functionality 165(1). Similarly, mobility management functionality 160(2) is co-located with local NodeB functionality 132(2) and local packet routing and forwarding functionality 165(2).

In one example, distributed mobility management functionality logic 155(1) may cause AP 120(1) to co-locate mobility management functionality 160(1) with local NodeB functionality 132(1) and local packet routing and forwarding functionality 165(1). AP 120(1) may obtain, from UE 105(1) (for example), a request to connect to AP 120(1). AP 120(1) may provide UE 105(1) with wireless network connectivity using co-located mobility management functionality 160(1), local NodeB functionality 132(1), and local packet routing and forwarding functionality 165(1). Distributed mobility management functionality logic 155(2) may cause AP 120(2) to perform similar operations.

In the example of FIG. 1, a total number of mobility management functionalities 160(1) and 160(2) (here, two) is equal to a total number of APs 120(1) and 120(2) (also two). It may be advantageous in certain embodiments for each AP 120(1) and 120(2) to include a respective mobility management functionality 160(1) and 160(2). For example, although it is possible in certain examples for multiple APs to share a single mobility management functionality located on a single AP, there are significant challenges to this approach. The mobility management functionality would need to scale to handle all the UEs from the multiple APs. This may in turn require additional memory and Central Processing Unit (CPU) resources on the AP that includes the mobility management functionality. By contrast, system 100 reduces the computational burden because the total number of mobility management functionalities 160(1) and 160(2) is equal to the total number of the APs 120(1) and 120(2).

If enterprise network 110 is a 4G network, mobility management functionalities 160(1) and 160(2) may comprise 4G Mobility Management Entities (MMEs), and local packet routing and forwarding functionalities 165(1) and 165(2) may comprise a Local Gateway (L-GW) (e.g., one or more Serving Gateways (S-GWs) and/or Packet Data Network (PDN) Gateway (P-GWs)). If enterprise network 110 is a 5G network, mobility management functionalities 160(1) and 160(2) may comprise at least a portion of Access and Mobility Management Functions (AMFs) and/or Session Management Function (SMFs), and local packet routing and forwarding functionalities 165(1) and 165(2) may comprise at least a portion of a SMF and/or User Plane Function (UPF).

Reference is now made to FIGS. 2-5. FIGS. 2-5 relate to the control plane that handles signaling to/from UEs (e.g., UEs 105(1)-105(5)) as well as to/from APs (e.g., APs 120(1) and 120(2)).

Figure 2:
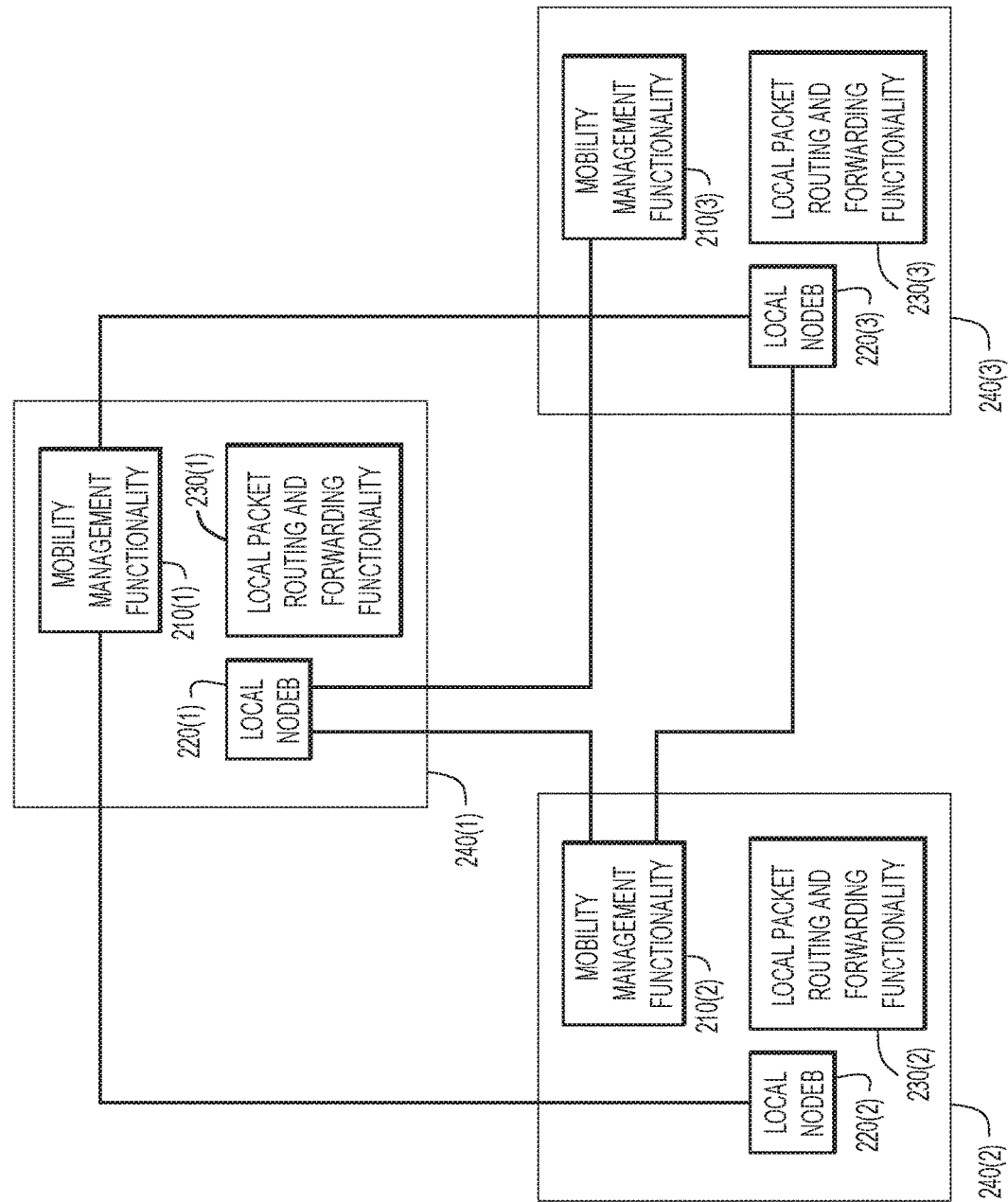
FIG. 2 illustrates a logical arrangement of respective mobility management functionalities, local base station/access point functionalities, and local packet routing and forwarding functionalities, according to an example embodiment.

FIG. 2 illustrates a logical arrangement 200 of respective mobility management functionalities 210(1)-210(3), local NodeB functionalities 220(1)-220(3), and local packet routing and forwarding functionalities 230(1)-230(3). Mobility management functionality 210(1), local NodeB functionality 220(1), and local packet routing and forwarding functionality 230(1) comprise a first logical group (e.g., located on AP 240(1)). Mobility management functionality 210(2), local NodeB functionality 220(2), and local packet routing and forwarding functionality 230(2) comprise a second logical group (e.g., located on AP 240(2)). Mobility management functionality 210(3), local NodeB functionality 220(3), and local packet routing and forwarding functionality 230(3) comprise a third logical group (e.g., located on AP 240(3)). Because each AP 240(1)-240(3) includes a respective mobility management functionality 210(1)-210(3), the need for a centralized packet core is obviated. As in the example of FIG. 1, a total number of mobility management functionalities 210(1)-210(3) (here, three) is equal to a total number of APs 240(1)-240(3) (also three).

Each mobility management functionality 210(1)-210(3) is configured to communicate with its respective local NodeB functionality 220(1)-220(3), creating a mesh. For example, mobility management functionality 210(1) communicates with local NodeB functionality 220(1), mobility management functionality 210(2) communicates with local NodeB functionality 220(2), and mobility management functionality 210(3) communicates with local NodeB functionality 220(3). Moreover, mobility management functionality 210(1) is configured to communicate with local NodeBs 220(2) and 220(3); mobility management functionality 210(2) is configured to communicate with local NodeBs 220(1) and 220(3); and mobility management functionality 210(3) is configured to communicate with local NodeB 220(1).

Figure 3B:
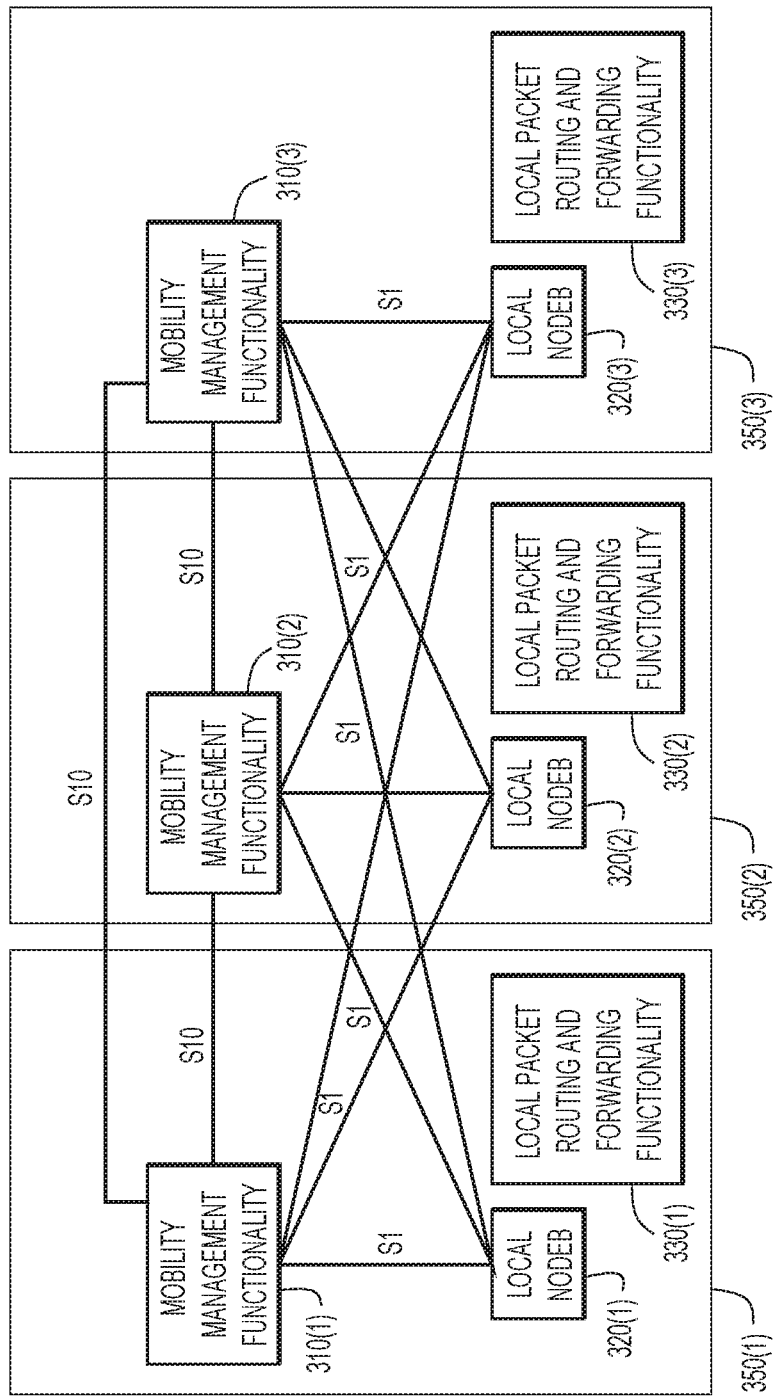

FIGS. 3A and 3B illustrate assignment of mobility management functionalities to respective APs. As shown in FIG. 3A, a logical arrangement 300A of a plurality of mobility management functionalities 310(1)-310(3) and respective local NodeB functionalities 320(1)-320(3) and local packet routing and forwarding functionalities 330(1)-330(3) are shown in a combined S1/S10 interface mesh. Initially, mobility management functionalities 310(1)-310(3) are included in pool 340. Local NodeB 320(1) and local packet routing and forwarding functionality 330(1) are located in AP 350(1), local NodeB 320(2) and local packet routing and forwarding functionality 330(2) are located in AP 350(2), and local NodeB 320(3) and local packet routing and forwarding functionality 330(3) are located in AP 350(3). Mobility management functionalities 310(1)-310(3) are configured to communicate with each other via S10 interfaces (e.g., for inter-MME context transfer), and with a plurality of local NodeBs 320(1)-320(3) via S1 interfaces.

FIG. 3B shows a logical arrangement 300B of respective mobility management functionalities 310(1)-310(3), local NodeB functionalities 320(1)-320(3), and local packet routing and forwarding functionalities 330(1)-330(3) in the combined S1/S10 interface mesh. Here, mobility management functionalities 310(1)-310(3) have been assigned to APs 350(1)-350(3), respectively. Accordingly, mobility management functionalities 310(1)-310(3) are respectively co-located with local NodeB functionalities 320(1)-320(3) and local packet routing and forwarding functionalities 330(1)-330(3).

Figure 4:
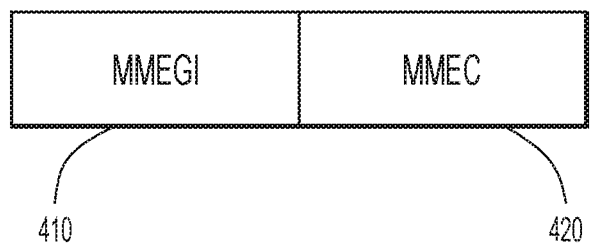
FIG. 4 illustrates an identification of a Mobility Management Entity, according to an example embodiment.

FIG. 4 illustrates an example identification 400 of an MME. Identification 400 may include MME Group ID (MMEGI) 410 and MME Code 420. MMEGI 410 may be a 16-bit indication of the pool to which the MME belongs (e.g., the pool number corresponding to pool 340). MME Code 420 may be an 8-bit indication of the particular MME within the pool.

Figure 5:
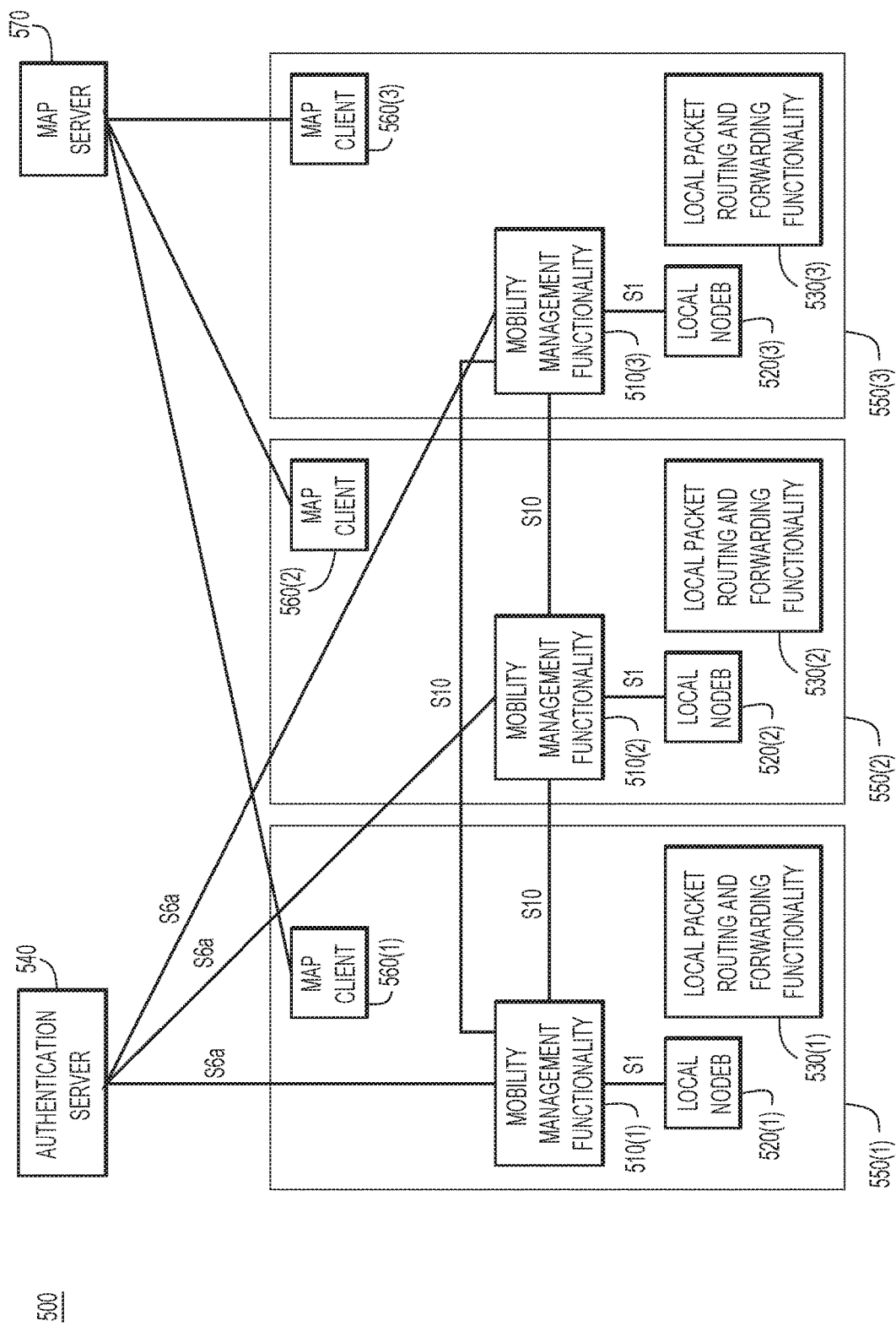
FIG. 5 illustrates a logical grouping of respective mobility management functionalities, local base station/access point functionalities, and local packet routing and forwarding functionalities in an S10 interface mesh in communication with an authentication server and a map server, according to an example embodiment.

FIG. 5 illustrates a logical grouping 500 of respective mobility management functionalities 510(1)-510(3), local NodeB functionalities 520(1)-520(3), and local packet routing and forwarding functionalities 530(1)-530(3) in an S10 interface mesh. Mobility management functionalities 510(1)-510(3) are configured to communicate with each other via S10 interfaces (e.g., for inter-MME context transfer), and with respective local NodeBs 320(1)-320(3) via S1 interfaces. Mobility management functionalities 510(1)-510(3) may communicate with authentication server 540 via respective S6a interfaces.

Logical grouping 500 includes APs 550(1), 550(2), and 550(3). AP 550(1) may include mobility management functionality 510(1), local NodeB functionality 520(1), and local packet routing and forwarding functionality 530(1). AP 550(2) may include mobility management functionality 510(2), local NodeB functionality 520(2), and local packet routing and forwarding functionality 530(2). AP 550(3) may include mobility management functionality 510(3), local NodeB functionality 520(3), and local packet routing and forwarding functionality 530(3). APs 550(1)-550(3) also respectively include map clients 560(1)-560(3) which communicate with map server 570.

Figure 6:
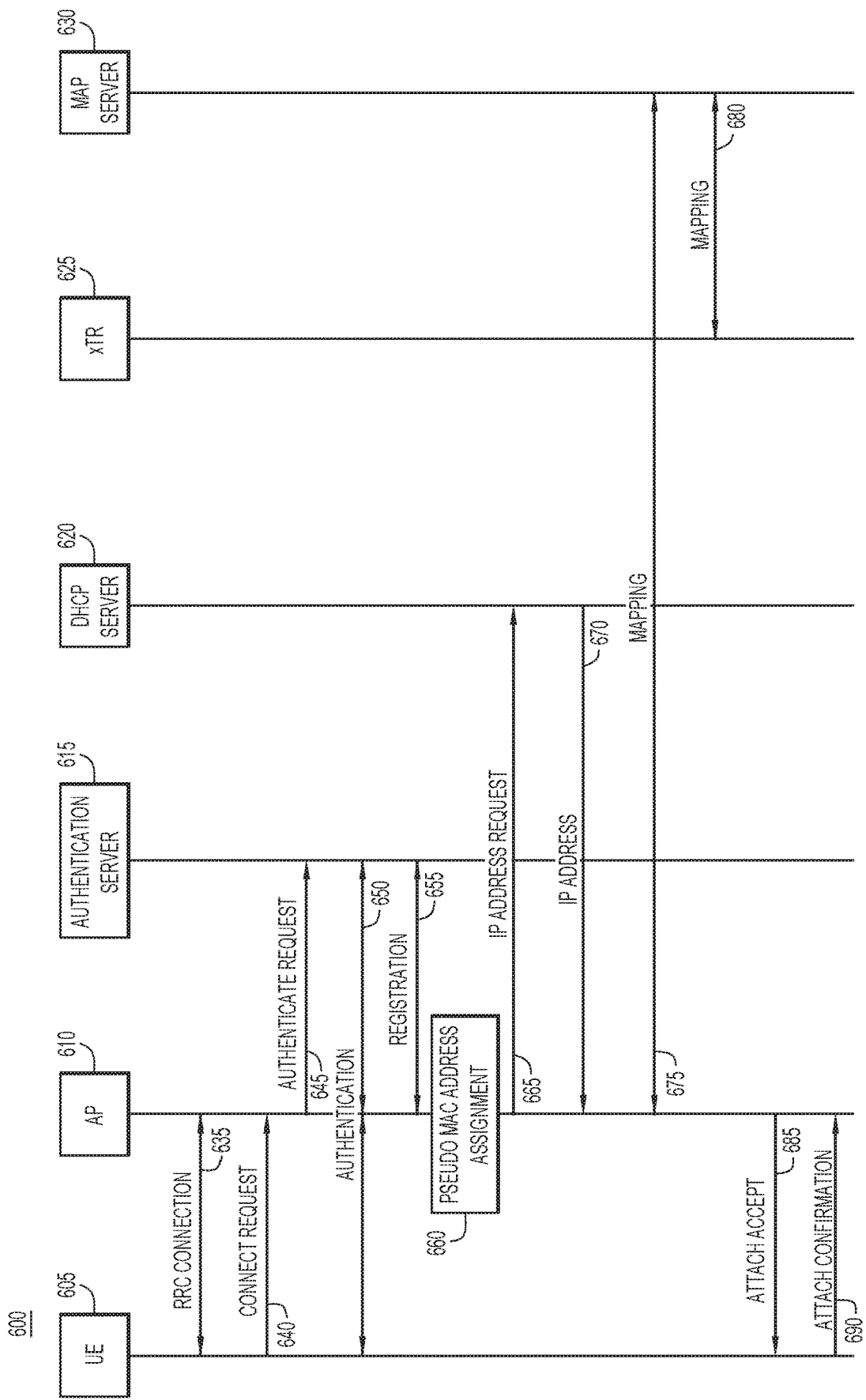
FIG. 6 illustrates a call flow diagram for user equipment to connect to an on-premise access point, according to an example embodiment.

FIG. 6 illustrates an example call flow/message sequence 600 for UE 605 to connect to on-premise AP 610. Call flow 600 involves communications between UE 605, AP 610, authentication server 615, Dynamic Host Configuration Protocol (DHCP) server 620, xTR 625, and map server 630. AP 610, authentication server 615, Dynamic Host Configuration Protocol (DHCP) server 620, xTR 625, and map server 630 may be part of an enterprise network. UE 605 may be new to the enterprise network (e.g., UE may have recently entered a coverage area of the enterprise network, such as the coverage area provided by AP 610).

At 635, a Radio Resource Control (RRC) connection is established between UE 605 and AP 610. As part of RRC connection setup, AP 610 provides UE 605 with a Radio Network Temporary Identifier (RNTI). At 640, AP 610 obtains, from UE 605, a request to connect to AP 610. The request to connect may include an attach request with an International Mobile Subscriber Identity (IMSI) and a PDN connectivity request with an AP Name (APN). The APN may be a Local Internet Protocol Access (LIPA) APN (e.g., identifying the enterprise). At 645, in response to obtaining the request to connect, AP 610 provides, to authentication server 615, a request to authenticate UE 605. The request to authenticate may include the IMSI. At 650, based on a response from authentication server 615, AP 610 (and more specifically, the mobility management functionality co-located with AP 610) authenticates UE 605. Authentication may occur between UE 605, AP 610, and authentication server 615 using a 3rd Generation Partnership Project (3GPP) Authentication and Key Agreement (AKA) protocol. UE 605 may be assigned the mobility management functionality local to AP 610, which may be responsible for performing AKA authentication.

At 655, AP 610 registers UE 605 with authentication server 615. In particular, AP 610 may indicate to authentication server 615 that AP 610 is associated with UE 605 using a location update procedure. At 660, AP 610 assigns a pseudo Media Access Control (MAC) address to UE 605. At 665, AP 610 requests, from DHCP server 620, an IP address for UE 605. AP 610 may include the pseudo MAC address in the request for the IP address. At 670, AP 610 obtains, from DHCP server 620, the IP address for UE 605. At 675, AP 610 provides to map server 630, a mapping of the pseudo MAC address to the IP address for UE 605. Map server 630 thereby registers the IP address.

At 680, map server 630 provides an indication of the mapping to one or more network nodes (e.g., xTR 625) to enable AP 610 to provide UE 605 with wireless network connectivity. xTR 625 may update its tunneling information to provide packets carrying the pseudo-MAC address between AP 610 and the Internet. At 685, AP provides, to UE 605, an attach accept with a Globally Unique Temporary ID (GUTI) and PDN connectivity accept with the IP address. At 690, AP 610 receives, from UE 605, an attach confirmation.

UE 605 may thereafter communicate with the Internet through AP 610. Thus, call flow/message sequence 600 enables UE 605 to connect to on-premise AP 610 to obtain Internet connectivity.

Figure 7:
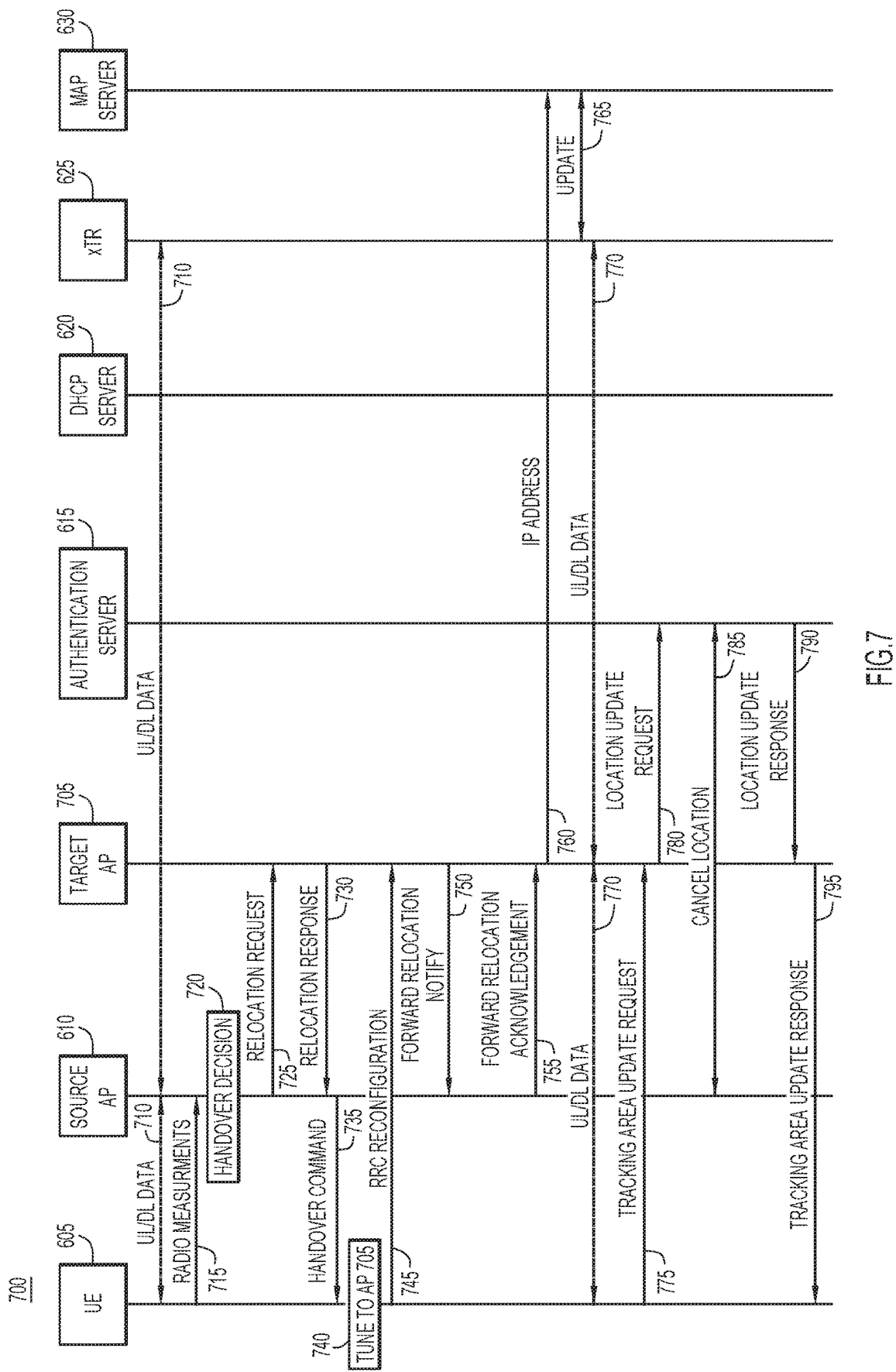
FIG. 7 illustrates a call flow diagram for a user equipment handover procedure from a source on-premise access point to a target on-premise access point, according to an example embodiment.

FIG. 7 illustrates an example call flow 700 for a UE handover procedure from AP 610 to on-premise AP 705. Call flow 700 involves communications between UE 605, AP 610, AP 705, authentication server 615, DHCP server 620, xTR 625, and map server 630. AP 610 is depicted as a "source AP" and AP 705 is depicted as a "target AP" because handover is occurring from AP 610 to AP 705 (e.g., UE 605 is transitioning from AP 610 to AP 705). Communications between AP 610 and AP 705 may occur via any suitable interface (e.g., S10, S1/S10, X2, etc.). Call flow diagram 700 may occur after call flow diagram 600. In one example, UE 605 may have recently moved from the coverage area of AP 610 to the coverage area of AP 705.

At 710, UE 605, AP 610, and xTR 625 share Uplink/Downlink (UL/DL) data with each other. At 715, AP 610 obtains radio measurements from UE 605. At 720, AP 610 determines whether AP 705 (rather than AP 610) should provide UE 605 with wireless network connectivity based on, for example, radio measurements 715. In this example, AP 610 determines that AP 705 should provide UE 605 with wireless network connectivity. At 725, AP 610 provides a relocation request to AP 705. The relocation request may include the IP address assigned to UE 605, the pseudo MAC address assigned to UE 605, and configuration information for a local S-GW and/or P-GW located at AP 705. AP 705 may communicate with the mobility management functionality local to the AP 610. The mobility management functionality local to the AP 610 may serve as an anchor for UE 605 handover.

At 730, AP 610 obtains a relocation response from AP 705. The relocation response may include an AP 610-to-AP 705 container to enable handover. At 735, AP 610 provides a handover command to UE 605. At 740, in response to obtaining the handover command, UE 605 tunes to AP 705. At 745, UE 605 sends an RRC reconfiguration message to AP 705. At 750, AP 610 obtains, from AP 705, a notification that AP 705 is providing UE 605 with wireless network connectivity. The notification may be a forward relocation notify. AP 610 may clean up radio resources in response to receiving the forward relocation notify and, at 755, provide a forward relocation acknowledgment message to AP 705.

At 760, AP 705 registers the IP address of UE 605 at map server 630. At 765, map server 630 updates xTR 625 to enable traffic between UE 605 and the Internet to flow via AP 705. At 770, UE 605, AP 705, and xTR 625 share UL/DL data with each other. AP 705 broadcasts a Tracking Area Identity (TAI) that is different than that of AP 610. At 775, upon detecting the TAI, UE 605 sends a Tracking Area Update (TAU) request to AP 705. At 780, AP 705 sends a location update request to authentication server 615 to cause authentication server 615 to register AP 705. The location update request may include an IMSI. At 785, authentication server 615 cancels the registration of the source AP and sends a cancel location message to AP 610. In an alternative embodiment, xTR signaling (e.g., from xTR 625) may be used to cancel the location in AP 610, rather than authentication server 615 sending the cancel location message. At 790, authentication server 615 sends a location update response to AP 705. At 795, AP 705 sends a TAU response accept to UE 605. The TAU response accept may include a new temporary identity.

Figure 8:
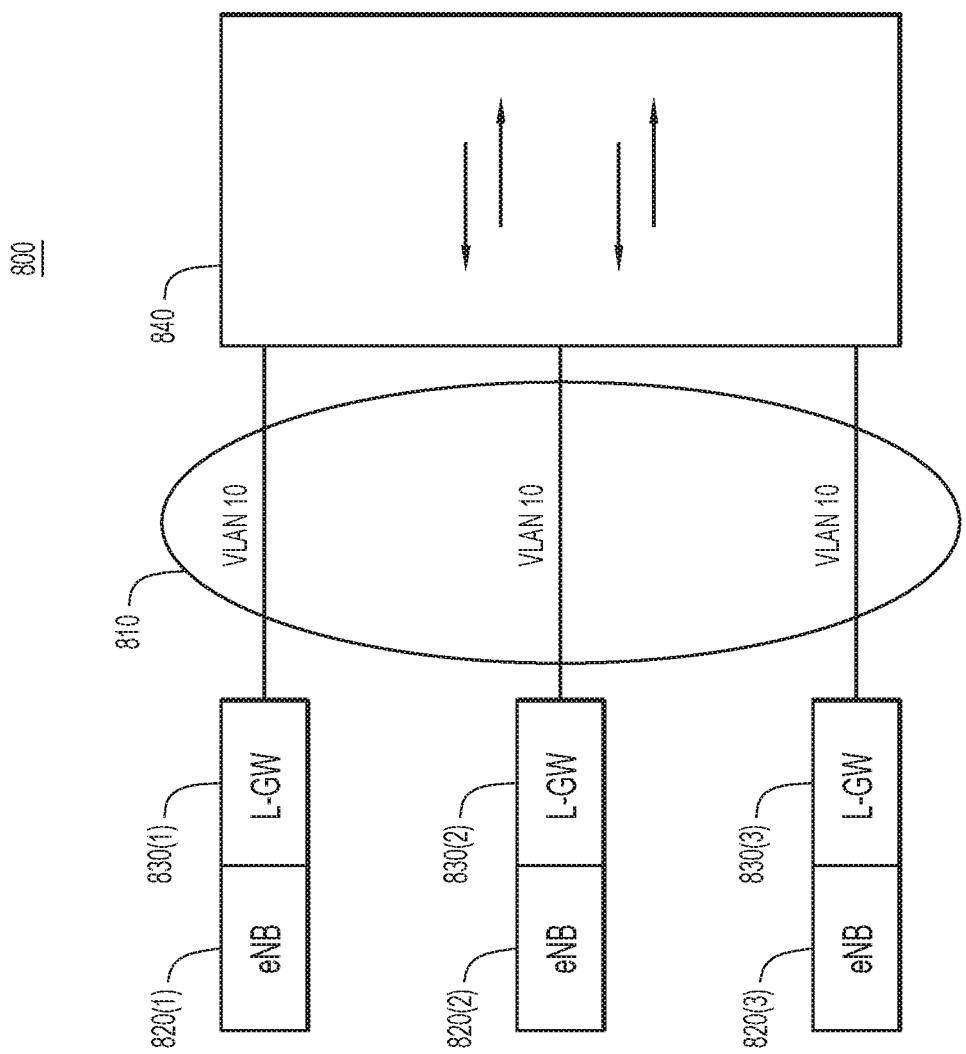
FIG. 8 illustrates a data plane with a single client Virtual Local Area Network, according to an example embodiment.
Figure 9:
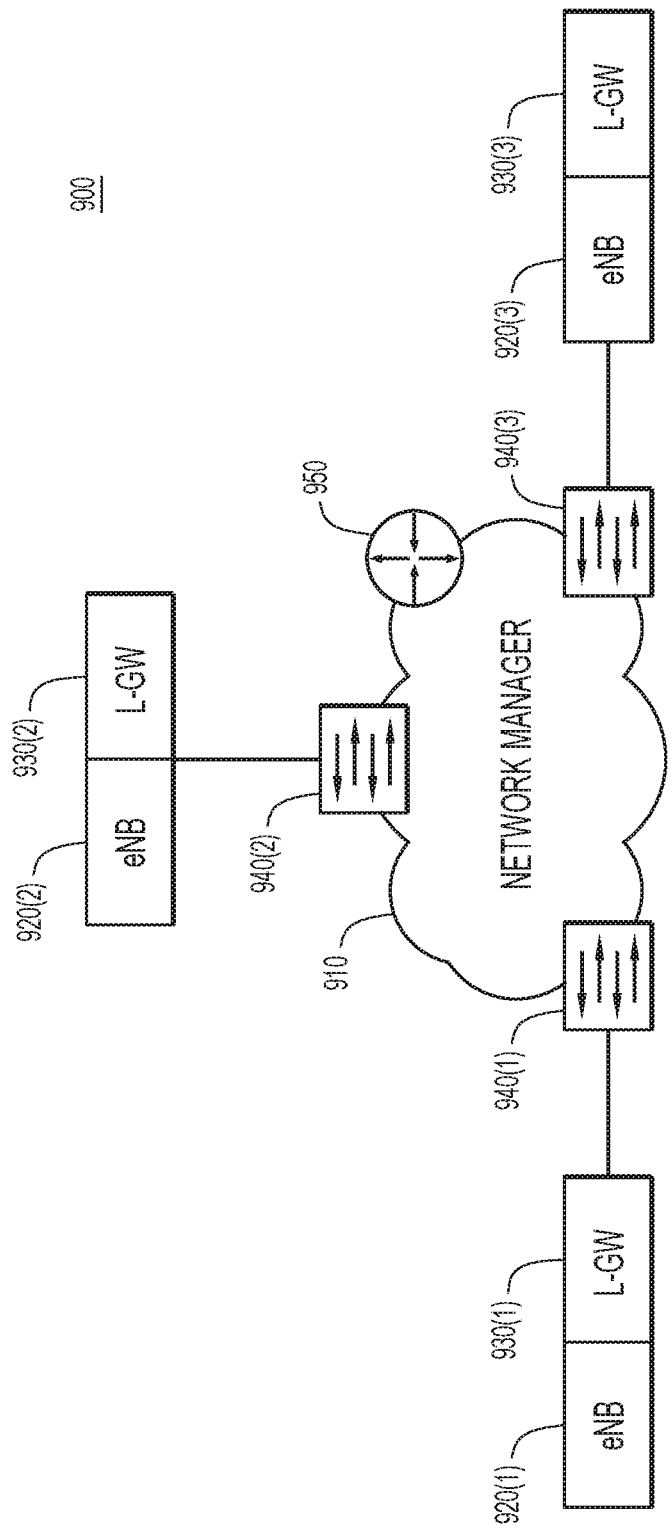
FIG. 9 illustrates a data plane with a network manager in a 4G implementation, according to an example embodiment.
Figure 10:
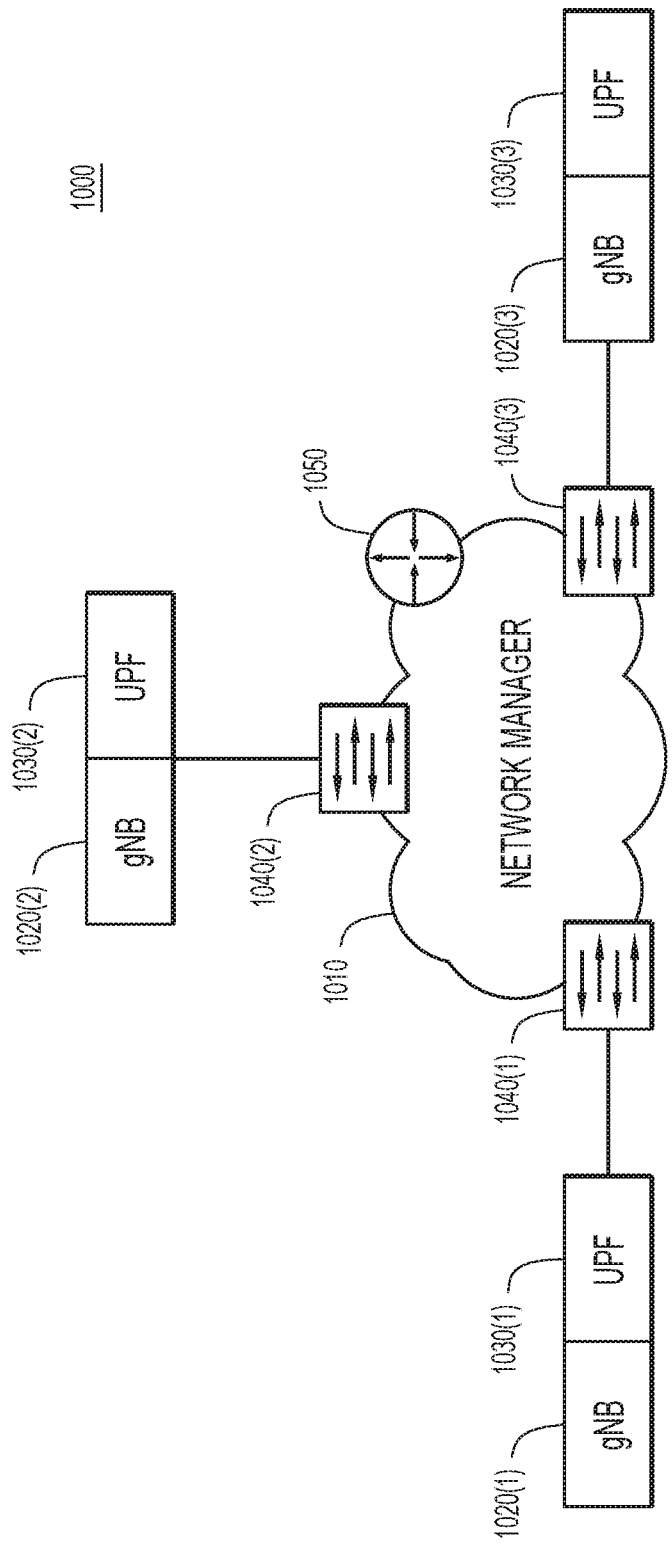
FIG. 10 illustrates a data plane with a network manager in a 5G implementation, according to an example embodiment.

FIGS. 8-10 depict aspects of the data plane, which may handle traffic to/from UEs. In particular, FIGS. 8-10 illustrate alternative data planes which may support the techniques described herein.

FIG. 8 illustrates a data plane 800 with a single client Virtual Local Area Network (VLAN) 810 in a 4G implementation. As shown, eNBs 820(1)-820(3) may send/receive communications over VLAN 810 via L-GWs 830(1)-830(3) (e.g., S-GWs and/or P-GWs) and one or more switches 840. In this case, each eNB 820(1)-820(3) has a corresponding L-GW 830(1)-830(3) that performs a local breakout. Each L-GW 830(1)-830(3) is configured to bridge traffic on the same VLAN 810. This ensures IP address continuity for UEs moving between eNBs 820(1)-820(3).

FIG. 9 illustrates an example data plane 900 with a network manager 910 in another 4G implementation. As shown, co-located eNBs 920(1)-920(3) and L-GWs 930(1)-930(3) communicate with network manager 910 via switches 940(1)-940(3). Network manager 910 may be part of (or connected to) a network that includes one or more routers 950. When data plane 900 is deployed, it may enable 4G systems to utilize techniques described herein.

FIG. 10 illustrates a similar example data plane 1000 with a network manager 1010, but for a 5G implementation. As shown, co-located gNBs 1020(1)-1020(3) and UPFs 1030(1)-1030(3) communicate with network manager 1010 via switches 1040(1)-1040(3). Network manager 1010 may be part of (or connected to) a network that includes one or more routers 1050. When data plane 1000 is deployed, it may enable 5G systems to utilize techniques described herein.

Figure 11:
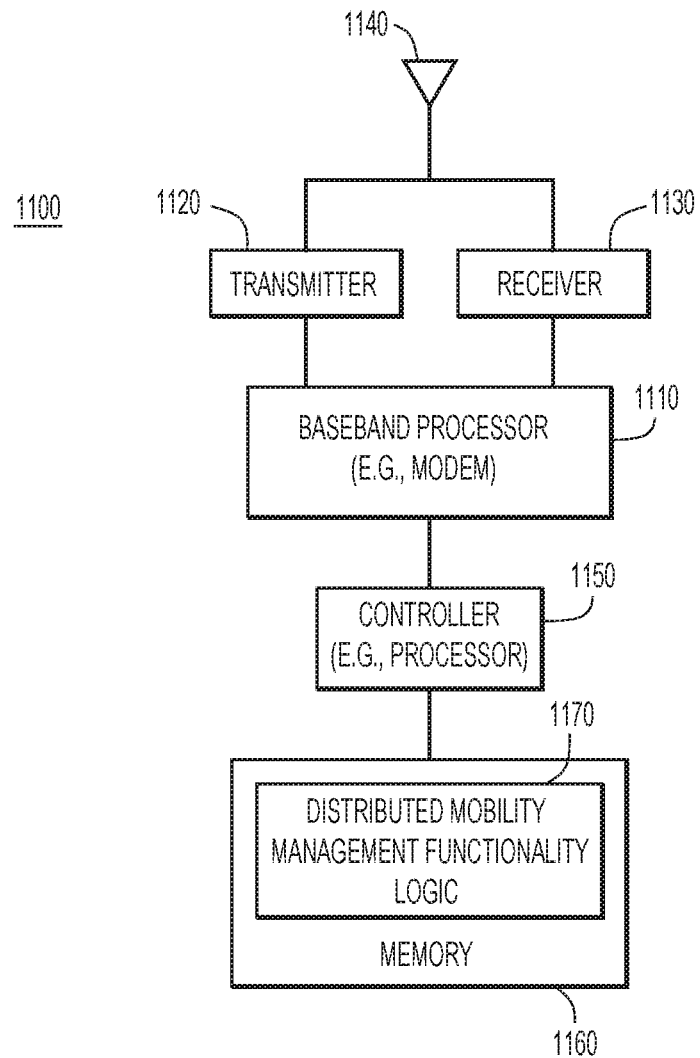
FIG. 11 illustrates a block diagram of an on-premise access point configured to perform one or more operations in accordance with a distributed mobility management functionality, according to an example embodiment.

Reference is now made to FIG. 11 which shows a block diagram of AP 1100, which is capable of performing operations presented herein. AP 1100 includes a baseband processor (e.g., modem) 1110, transmitter 1120, receiver 1130, antenna 1140, controller 1150, and memory 1160. Transmitter 1120 and receiver 1130 are connected to antenna 1140.

Baseband processor 1110 may be implemented by fixed or programmable digital logic gates, such as in the form of an application specific integrated circuit (ASIC), or may be implemented by a dedicated digital signal processor, microprocessor, or microcontroller. Controller 1150 is coupled to baseband processor 1110 and provides higher level control for AP 1100. Controller 1150 may be a microprocessor or microcontroller. Memory 1160 stores instructions that controller 1150 executes to perform the operations on behalf of AP 1100. Among operations are those performed when controller 1150 executes instructions for distributed mobility management functionality logic 1170 stored in memory 1160.

Memory 1160 may be read only memory (ROM), random access memory (RAM), magnetic disk storage media devices, optical storage media devices, flash memory devices, electrical, optical, or other physical/tangible memory storage devices. Thus, in general, memory 1160 may comprise one or more tangible (non-transitory) computer readable storage media (e.g., a memory device) encoded with software comprising computer executable instructions and when the software is executed (by controller 1150) it is operable to perform operations described herein.

Figure 12:
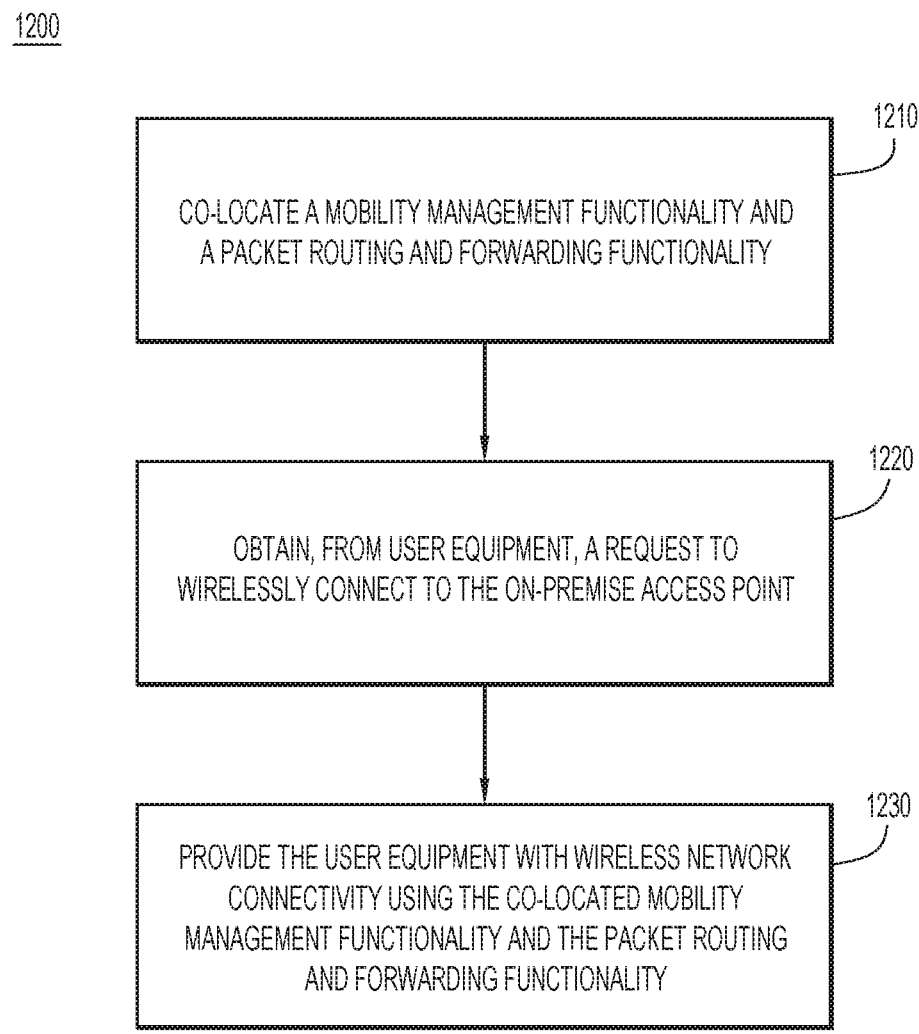
FIG. 12 illustrates a flowchart of a method for providing wireless network connectivity using a distributed mobility management functionality, according to an example embodiment.

FIG. 12 illustrates a flowchart of a method 1200 for providing wireless network connectivity using a distributed mobility management functionality. Method 1200 may be performed at each of a plurality of on-premise APs. At 1210, each of the plurality of on-premise APs co-locate a mobility management functionality and a packet routing and forwarding functionality. At 1220, each of the plurality of on-premise APs obtain, from UE, a request to wirelessly connect to the on-premise AP. At 1230, each of the plurality of on-premise APs provide the UE with wireless network connectivity using the co-located mobility management functionality and the packet routing and forwarding functionality.

Techniques are provided to enable low-scale (e.g., 2-4 APs) private Long-Term Evolution (LTE) (Citizens Broadband Radio Service) deployments without requiring deployment of a separate centralized Evolved Packet Core (EPC). This may be achieved by distributing EPC among eNBs and establishing communications between the eNBs and distributed EPC. These techniques are consistent with existing functionality (e.g., mobility) and may require no changes to the UE. This simplifies the deployment of low-scale private LTE systems by eliminating the need for a centralized EPC. In certain examples, subscriber management may be centralized. Operations described herein may also enable a mobile UE to move between APs while retaining their IP address and cause packets from the Internet to arrive at the target AP.

In 5G systems, UEs may support Extensible Authentication Protocol (EAP)/Non-Access Stratum (NAS). There are at least two options for authentication service implementation, which may be centralized. First, private UEs may also support certificates and EAP-Transport Layer Security (EAP-TLS). Second, enterprise Authentication, Authorization, and Accounting (AAA) servers may be enhanced with EAP-Authentication and Key Agreement (EAP-AKA) capabilities (along with a Remote Authentication Dial-In User Service (RADIUS) interface to carry the EAP-AKA to/from one or more gNBs).

In one form, a method is provided. The method comprises: at each of a plurality of on-premise access points: co-locating a mobility management functionality and a packet routing and forwarding functionality; obtaining, from user equipment, a request to wirelessly connect to the on-premise access point; and providing the user equipment with wireless network connectivity using the co-located mobility management functionality and the packet routing and forwarding functionality.

In one example, a total number of the plurality of mobility management functionalities is equal to a total number of the plurality of on-premise access points.

In one example, the method further comprises: at a first on-premise access point of the plurality of on-premise access points: in response to obtaining the request to wirelessly connect to the first on-premise access point, providing, to an authentication server, a request to authenticate the user equipment; based on a response from the authentication server, authenticating the user equipment; and registering the user equipment with the authentication server.

In one example, the method further comprises: at a first on-premise access point of the plurality of on-premise access points: assigning a pseudo media access control address to the user equipment; requesting, from a dynamic host configuration protocol server, an IP address for the user equipment; obtaining, from the dynamic host configuration protocol server, the IP address for the user equipment; and providing, to a map server, a mapping of the pseudo media access control address to the IP address for the user equipment, wherein the map server provides an indication of the mapping to one or more network nodes to enable the first on-premise access point to provide the user equipment with wireless network connectivity.

In one example, the method further comprises: at a first on-premise access point of the plurality of on-premise access points: determining that a second on-premise access point of the plurality of on-premise access points should provide the user equipment with wireless network connectivity; providing, to the second on-premise access point, a relocation request; providing, to the user equipment, a handover command; and obtaining, from the second on-premise access point, a notification that the second on-premise access point is providing the user equipment with wireless network connectivity.

In one example, the on-premise access points are 4G on-premise access points, the mobility management functionality comprises a mobility management entity, and the packet routing and forwarding functionality comprises a gateway.

In one example, the on-premise access points are 5G on-premise access points, the mobility management functionality comprises an access and mobility management function and a session management function, and the packet routing and forwarding functionality comprises a user plane function.

In another form, a system is provided. The system comprises: a plurality of on-premise access points configured to: co-locate a mobility management functionality and a packet routing and forwarding functionality; obtain, from user equipment, a request to wirelessly connect to the on-premise access point; and provide the user equipment with wireless network connectivity using the co-located mobility management functionality and the packet routing and forwarding functionality.

In another form, one or more non-transitory computer readable storage media are provided. The non-transitory computer readable storage media are encoded with instructions that, when executed by processors of a plurality of on-premise access points, cause each of the plurality of on-premise access points to: co-locate a mobility management functionality and a packet routing and forwarding functionality; obtain, from user equipment, a request to wirelessly connect to the on-premise access point; and provide the user equipment with wireless network connectivity using the co-located mobility management functionality and the packet routing and forwarding functionality.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at an on-premise access point of a plurality of on-premise access points:
        co-locating a mobility management functionality and a packet routing and forwarding functionality to provide a co-located mobility management functionality and a co-located packet routing and forwarding functionality;
        obtaining, from user equipment, a request to wirelessly connect to the on-premise access point;
        assigning a pseudo media access control address to the user equipment;
        requesting, from a dynamic host configuration protocol server, an Internet Protocol address for the user equipment;
        obtaining, from the dynamic host configuration protocol server, the Internet Protocol address;
        providing, to a map server, a mapping of the pseudo media access control address to the Internet Protocol address, wherein the map server provides an indication of the mapping to one or more network nodes to enable the on-premise access point to provide the user equipment with wireless network connectivity; and
        providing the user equipment with the wireless network connectivity using the co-located mobility management functionality and the co-located packet routing and forwarding functionality.

2. The method of claim 1, wherein a total number of mobility management functionalities including the mobility management functionality is equal to a total number of the plurality of on-premise access points.

3. The method of claim 1, further comprising:
    at the on-premise access point:
        in response to obtaining the request to wirelessly connect to the on-premise access point, providing, to an authentication server, a request to authenticate the user equipment;
        based on a response from the authentication server, authenticating the user equipment; and
        registering the user equipment with the authentication server.

4. The method of claim 1, further comprising:
    at the on-premise access point:
        determining that another on-premise access point of the plurality of on-premise access points should provide the user equipment with the wireless network connectivity;
        providing, to the other on-premise access point, a relocation request;
        providing, to the user equipment, a handover command; and
        obtaining, from the other on-premise access point, a notification that the other on-premise access point is providing the user equipment with the wireless network connectivity.

5. The method of claim 1, wherein the on-premise access point comprises a fourth generation (4G) on-premise access point.

6. The method of claim 5, wherein the mobility management functionality comprises a mobility management entity, and the packet routing and forwarding functionality comprises a gateway.

7. The method of claim 1, wherein the on-premise access point comprises a fifth generation (5G) on-premise access point.

8. The method of claim 7, wherein the mobility management functionality comprises an access and mobility management function and a session management function, and the packet routing and forwarding functionality comprises a user plane function.

9. A system comprising:
    a plurality of on-premise access points including an on-premise access point configured to:

co-locate a mobility management functionality and a packet routing and forwarding functionality to provide a co-located mobility management functionality and a co-located packet routing and forwarding functionality;

obtain, from user equipment, a request to wirelessly connect to the on-premise access point;

assign a pseudo media access control address to the user equipment;

request, from a dynamic host configuration protocol server, an Internet Protocol address for the user equipment;

obtain, from the dynamic host configuration protocol server, the Internet Protocol address;

provide, to a map server, a mapping of the pseudo media access control address to the Internet Protocol address, wherein the map server provides an indication of the mapping to one or more network nodes to enable the on-premise access point to provide the user equipment with wireless network connectivity; and provide the user equipment with the wireless network connectivity using the co-located mobility management functionality and the co-located packet routing and forwarding functionality.

10. The system of claim 9, wherein a total number of mobility management functionalities including the mobility management functionality is equal to a total number of the plurality of on-premise access points.

11. The system of claim 9, wherein the on-premise access point is further configured to:
in response to obtaining the request to wirelessly connect to the on-premise access point, provide, to an authentication server, a request to authenticate the user equipment;
based on a response from the authentication server, authenticate the user equipment; and
register the user equipment with the authentication server.

12. The system of claim 9, wherein the on-premise access point is further configured to:
determine that another on-premise access point of the plurality of on-premise access points should provide the user equipment with the wireless network connectivity;
provide, to the other on-premise access point, a relocation request;
provide, to the user equipment, a handover command; and
obtain, from the other on-premise access point, a notification that the other on-premise access point is providing the user equipment with the wireless network connectivity.

13. The system of claim 9, wherein the on-premise access point comprises a fourth generation (4G) on-premise access point, the mobility management functionality comprises a mobility management entity, and the packet routing and forwarding functionality comprises a gateway.

14. The system of claim 9, wherein the on-premise access point comprises a fifth generation (5G) on-premise access point, the mobility management functionality comprises an access and mobility management function and a session management function, and the packet routing and forwarding functionality comprises a user plane function.

15. One or more non-transitory computer readable storage media encoded with instructions that, when executed by a processor of an on-premise access point of a plurality of on-premise access points, cause the on-premise access point to:

co-locate a mobility management functionality and a packet routing and forwarding functionality to provide a co-located mobility management functionality and a co-located packet routing and forwarding functionality;

obtain, from user equipment, a request to wirelessly connect to the on-premise access point;

assign a pseudo media access control address to the user equipment;

request, from a dynamic host configuration protocol server, an Internet Protocol address for the user equipment;

obtain, from the dynamic host configuration protocol server, the Internet Protocol address;

provide, to a map server, a mapping of the pseudo media access control address to the Internet Protocol address, wherein the map server provides an indication of the mapping to one or more network nodes to enable the on-premise access point to provide the user equipment with wireless network connectivity; and provide the user equipment with the wireless network connectivity using the co-located mobility management functionality and the co-located packet routing and forwarding functionality.

16. The one or more non-transitory computer readable storage media of claim 15, wherein a total number of mobility management functionalities including the mobility management functionality is equal to a total number of the plurality of on-premise access points.

17. The one or more non-transitory computer readable storage media of claim 15, wherein the instructions further cause the on-premise access point to:
in response to obtaining the request to wirelessly connect to the on-premise access point, provide, to an authentication server, a request to authenticate the user equipment;
based on a response from the authentication server, authenticate the user equipment; and
register the user equipment with the authentication server.

18. The one or more non-transitory computer readable storage media of claim 15, wherein the instructions further cause the on-premise access point to:
determine that another on-premise access point of the plurality of on-premise access points should provide the user equipment with the wireless network connectivity;
provide, to the other on-premise access point, a relocation request;
provide, to the user equipment, a handover command; and
obtain, from the other on-premise access point, a notification that the other on-premise access point is providing the user equipment with the wireless network connectivity.

19. The one or more non-transitory computer readable storage media of claim 15, wherein the on-premise access point comprises a fourth generation (4G) on-premise access point, the mobility management functionality comprises a mobility management entity, and the packet routing and forwarding functionality comprises a gateway.

20. The one or more non-transitory computer readable storage media of claim 15, wherein the on-premise access point comprises a fifth generation (5G) on-premise access point, the mobility management functionality comprises an access and mobility management function and a session management function, and the packet routing and forwarding functionality comprises a user plane function.

* * * * *